P. M. MILLER.
VEHICLE WHEEL PNEUMATIC TIRE RIM.
APPLICATION FILED FEB. 5, 1919.
1,402,003.
Patented Jan. 3, 1922.
2 SHEETS—SHEET 2.
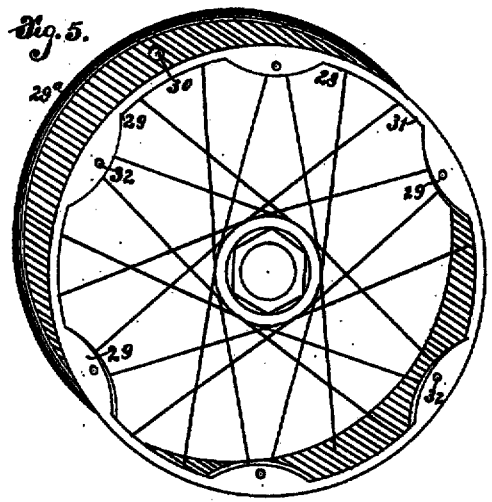
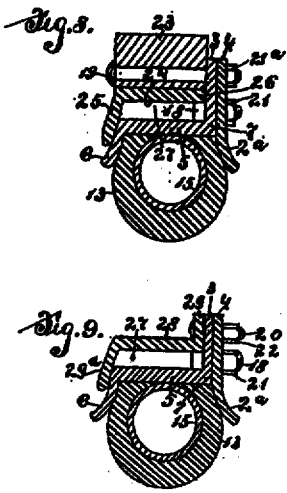
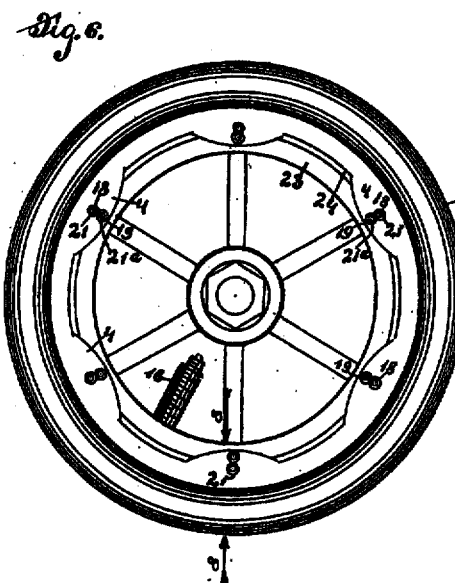
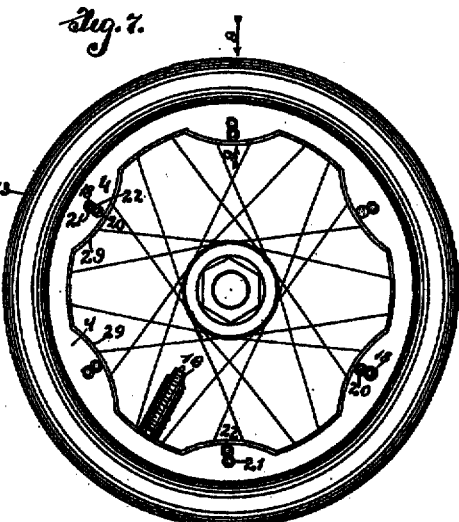
Inventor
Philip M. Miller

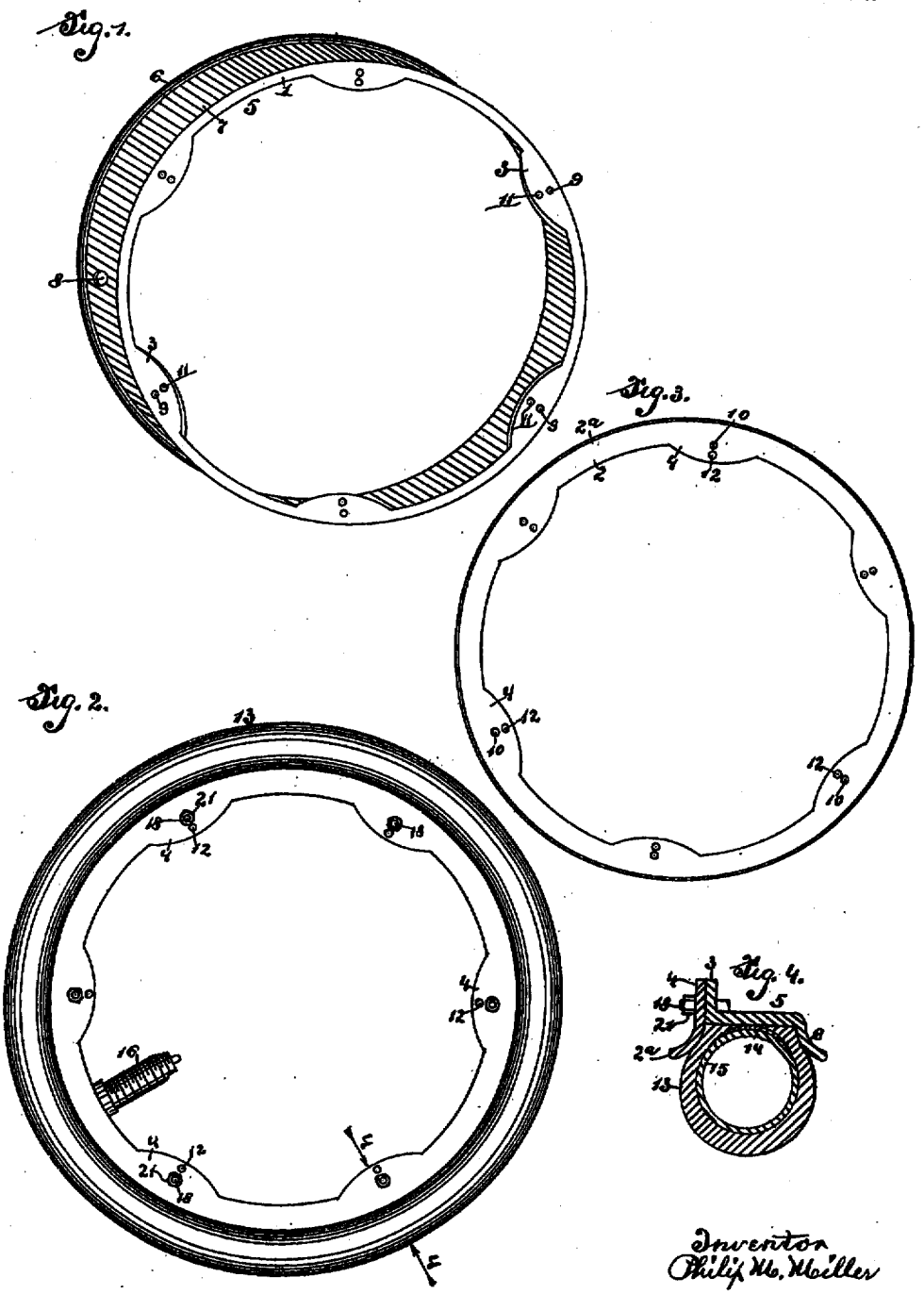

UNITED STATES PATENT OFFICE.

PHILIP M. MILLER, OF BROOKLYN, NEW YORK.

VEHICLE-WHEEL PNEUMATIC-TIRE RIM.

1,402,003.   Specification of Letters Patent.   Patented Jan. 3, 1922.

Application filed February 5, 1919. Serial No. 275,107.

*To all whom it may concern:*

Be it known that I, PHILIP M. MILLER, a citizen of the United States, residing in Brooklyn, in the county of Kings and State of New York, have invented certain new and useful Improvements in Vehicle-Wheel Pneumatic-Tire Rims, of which the following is a full, clear, and exact description, reference being had to the accompanying drawings.

My invention relates to improved means for mounting and quickly securing the tire casings upon demountable rims and means for quickly mounting and positively securing the rims with the inflated tires thereon upon vehicle wheels, and to means integral with the side of vehicle wheels, participating in locking the same rims upon the respective vehicle wheels.

It is the usual practice to put a pneumatic tire upon a demountable rim, and there inflate it before mounting the rim on the wheel of the motor vehicle. In the event the tire is injured or deflated, the rim is demounted, and replaced by another bearing an inflated tire; and the detaching of the injured tire from its rim, as well as the repairing of the tire, may be postponed.

For use with expansible and non-expansible bead tires, the rim may be of one integrally flanged endless type for easily mounting thereon and demounting therefrom, with a side removable endless flange or clench to hold the tire in position, and the same flange or clench to lockingly engage the side of the vehicle wheel whereupon the rim with its inflated tire is mounted and held circumferentially locked.

Nearly all demountable tire-carrying rims now in commercial use are used in connection with fastening means which exert at the same point both a radial and lateral pressure upon the rim (such as wedge clamps forced between the felly and rim, or wedge rings forced in by clamps), a considerable degree of skill is required for fastening a rim with such devices, because if skill and care are not exercised the rim is liable to be bolted on out of a true plane with the wheel, and the rim may be drawn off center in the tightening up of the locking elements. If one wedge or clamp is bolted too tight, the demountable rim is usually forced out of the plane of the wheel and eccentric with regard to the wheel center at the same time.

The object of my invention is to obviate these defects, and provide a demountable rim having original fastening means, and a wheel body, of such constructions that the rim, associating with a side removable endless flange or clench to prevent the inflated mounted tire thereon from dislodgment therefrom, can be quickly and easily mounted and locked upon the wheel body in a true plane with the wheel, and radially tensioned without danger of unduly distorting the rim and throwing the same off center, by the same means which secure the inflated tire on the rim and similar means provided in the side of the same wheel and rim.

Another object of my invention is that the means, locking the side removable flange or clench with the side of the rim after the tire is mounted on the rim, form an outer-side circumferential contact between the rim and wheel, thus participating in the formation of the double-contact line therebetween to prevent the formation of rust between the contacting surfaces of the rim and wheel.

Still another object of my invention is to provide locking elementary means which shall be devoid of all wedging action, because it causes the above mentioned effects.

In a sense the subject matters of this present application may be said to be improvements upon the subject matters disclosed in my pending applications Serial Numbers 117,565 and 270,368, August 29, 1916 and Jan. 9, 1919 the former embodying matter pertaining to mounting and holding on and demounting tire rims from the peripheral surface of vehicle wheels, while the latter disclosing means for mounting and holding inflated tires on demountable rims possessing the same characteristic features described in the present application.

Other particular advantages of the invention will appear from a detailed description of my invention in connection with the drawings forming a part thereof.

The specific object of my invention is to provide means which shall be applicable to rims and tires of all types, and which shall be provided in the vehicle wheels desired to carry such tires and rims.

In the specific embodiment, in which I have chosen to illustrate my invention, for the purpose of clear disclosure, Figure 1 is a perspective view of the demountable rim, without the side removable flange and tire, showing its original lines of construction; Figure 2 is a side elevation of the demountable rim having thereon an inflated tire with the side removable flange in contact with the outer side thereof and locked with the side of the rim; Figure 3 is a perspective view of the demountable flange, showing its original lines of construction; Figure 4 is a cross section of Figure 2 taken on the line 4—4 as indicated by the arrows; Figure 5 is an enlarged perspective view of the wire wheel embodying featuring means for lockingly holding on its outer metallic periphery the demountable rim and side removable flange; Figure 6 is a side elevation of the demountable rim, carrying an inflated tire on its outer periphery and the removable flange locked thereagainst, mounted on the band of the felly of an artillery vehicle wheel and locked against the side thereof; Figure 7 is a view similar to Figure 6, particularly showing the original featuring means of locking the same rim with its inflated tire and removable flange on the metallic circumference of the wire wheel; Figure 8 is a cross sectional view of Figure 6 taken on the line 8—8 as indicated by the arrows; while Figure 9 is a view similar to Figure 8 of Figure 7 taken on the line 9—9 as indicated by the arrows.

Referring to Figure 1, the rim 5 is of an endless cylindrical construction having an inner-side integral circumferential flange or clench 6 and a circumferential tire-seating surface 7 outwardly extending to and terminating in a series of spaced radially extending flanges 3. The tire-seating surface 7 is provided with the usual opening 8 for receiving the usual inner tube stem, and each of the flanges 3 is provided with an outer opening 9 and an inner opening 11.

Referring to Figure 3, the side removable flange or clench 2 is of an endless circular construction having an outer circumferential periphery 2ª and an inner circumferential periphery 2 extending circumferentially to and terminating at intervals in a series of spaced radially extending flanges 4. As shown in Figure 4, the outer circumferential periphery 2ª comprises the outerside circumferential flange or clench for preventing the tire 13 from dislodgment from the tire-seating surface 7 of the rim 5, and the series of flanges 4 thereof each correspondingly forming means for engagement with the series of flanges 3 of the rim 5.

Each of the flanges 4 is provided with an outer opening 10 and an inner opening 12, the former aligning with the opening 9 and the latter aligning with the opening 11 of each of the flanges of the rim.

To lockingly hold the tire 13, with the inner tube stem 16 through the opening 8, on the tire-seating 7 of the rim 5, the endless circular flange or clench, shown in Figure 3 and hereinbefore described, is removably mated with the side 1 of the rim so that the flanges 4 align with the flanges 3 of the flange or clench and rim, respectively, and the outer circumferential periphery 2ª, forming a tire-engaging portion, engages the outer bead and side of the tire 13, thus mutually forming a circumferentially tire-seating channel between the integral flange or clench 6 of the rim and inner side of the respective periphery 2ª, as substantially shown in Figure 4. A series of bolts 18 each, particularly being provided with a square head which may conveniently extend to and terminate in a suitable obtuse or blunt portion, is removably secured in the corresponding openings 9 and 10 of the flanges 3 and flanges 4 of the rim and flange or clench, respectively, to securely draw the respective flanges 3 and 4 together and the rim firmly and creeplessly positioned in relation with the respective flange or clench 2, and to form, as hereinbefore described, a circumferential tire-seating channel; a series of nuts 21 each threadedly secured to the threaded end of each of the bolts 18 to lockingly hold the same in position, with their respective square heads in relation with inner surface of each of the flanges 3, to finally provide an inflated tire on the rim as ready for use, as shown in Figure 2, on the wheels, respectively shown in Figures 5, 6 and 7.

In the drawings I have illustrated an artillery wheel and a wire wheel each comprising a hub, spokes, and felly or fixed rim of the kind in most common use, the particular conformation of which is not important so far as the present invention is concerned, with the exception of the outer side of the tire-seating periphery of the wire wheel hereinafter described and illustrated in Figure 5.

As shown, the wire wheel is provided with an endless cylindrical periphery 28 having an inner-side integral circumferential flange or clench 29ª and a circumferential tire-seating surface 31 outwardly extending to and terminating in a series of spaced radially extending flanges 29. The tire-seating surface 31 is provided with the usual stem-receiving opening 30, and each of the flanges 29 is provided with an opening 32.

To demountably position the demountable rim 5, having thereon the inflated tire 13, the ordinary flap 14 and inner tube 15, with the inner-tube stem 16 through the usual opening in the felly 23 and band 24, as respectively shown in Figures 4 and 6, the assembled rim, tire and flange or clench, as particularly illustrated in Figure 2, is circumferentially mounted on the band 24 of the felly 23, the inner side of the rim seating on the inner-side integral flange 25 and the outer side thereof similarly relating with the outer circumferential portion 26 of the band, having interposed circumferentially the square heads of the series of bolts 18 to form a firm spacing means therebetween, as shown at 27. The series of spaced radially extending flanges 3 and 4 of the rim and flange or clench 2, respectively, engage the outer side of the felly 23, the corresponding inner openings 11 and 12 thereof each passing a bolt 19 ordinarily situated in the side of the felly 23, as shown in Figure 8, to be threadedly locked with a nut 21ª which, in turn, forces the contacting portion of the flange inwardly of the wheel, and the mounted assembled rim and tire circumferentially locked on the wheel, as shown in Figure 6, to be ready for use.

To similarly mount the assembled rim, inflated tire and side removable flange shown in Figure 2, on the rim-seating surface 28 of the wire wheel, shown in Figure 5, the inner side of the rim is circumferentially positioned on the integral flange 29ª thereof, with the inner-tube stem 16 through the opening 30, and the lockingly spaced square heads of the bolts 18 are circumferentially interposed between the outer sides of the respective rim and portion 31 of the wheel. The series of spaced radially extending flanges 3 and 4 of the rim and flange or clench 2, respectively, engage the flanges 29 of the wheel, the corresponding inner openings 11 and 12 of the rim and flange 2, respectively, align with the openings 32 in the side of the flanges 29 together to pass a bolt or suitable threaded member 20 to be threadedly locked with a nut 22 which, in turn, forces the contacting portion of the flanges inwardly of the wheel, and the mounted assembled rim and tire circumferentially locked on the wheel, as shown in Figure 7, to be ready for use.

Throughout the drawings the demountable rim and flange are shown in cross section to be of the straight flange type but they may be constructed of the clencher type as well.

To the end that my invention in its preferred form may be quickly understood, I shall here explain that a chief inventive idea embodied therein is that of clamping the rim in double-line, the subject matter of which is explained fully in the application Serial Number 117,565, with the periphery of the wheel, at its opposite sides, and side relative to the axis thereof. The term "double-line contact" means the relatively wide or broad line of contact afforded by the double circumferential contact of the inner side of the rim against the flange portion 25 of the band 24 of the artillery wheel, or flange portion 29ª of the wire wheel 28, and the square heads of the bolts 18 spacingly interposed between the outer side of the respective rim and felly band 24 of the artillery wheel, or the outer portion 31 of the wire wheel, the bolts 18 being retained by the openings 9 and 10 of the flanges of the respective rim and removable side flange which are thereby bound together, as hereinbefore described. By so supporting the rim at its double contact points I provide the rim and tire with an ideally firm support, coextensive with the circumference of the wheel, but so positive as to avoid all danger of the rusting together of the parts to an extent which would prevent the easy demounting of the rim from the wheel. A coincident inventive idea is that of providing the rim and removable side flange with such means which simultaneously serve as a positive binder for the outer side of the rim and removable flange together to form a tire-seating channel between their respective facing sides, and the assembled rim with its inflated tire secured on the wheel by locking the flanges of the rim and flange with the side of the wheel, thus participating in the formation of the double-line contact, hereinbefore described. Another coincident inventive idea is that of positively supporting the arc of the rim in the double-line contact and thereby preventing or avoiding the distortion of the rim, which would otherwise throw the rim out of true and tend to prevent circular mounting of the rim on the wheel.

From the foregoing description, taken in connection with the accompanying drawings, it will be apparent that I provide an exceedingly simple and highly efficient combination for quickly mounting the tire on the rim and quickly connecting and disconnecting the demountable rim to and from the wheel body. By means of the construction herein shown, the rim must necessarily be positioned upon the wheel in its true plane and the clamping means which are employed to ultimately fasten the rim against lateral movement are solely the integral means which so positively exercise the essential functions of binding and holding the rim on the wheel in a desired position. By means of the lateral fastening devices employed in connection with the side of the wheel, having spacingly interposed the square heads of the bolts between the rim and wheel, the rim with the tire is rigidly and properly connected to the wheel body, and, owing to the formed outer-side contact line, it is practically impossible to distort the rim during its use on the wheel on the road.

I know that numerous wheel bodies and demountable rims therefor are now, together with attachments for wedging the rim from the wheel body in a radial and outward direction, in common use for positively moving the rim axially and simultaneously causing radial pressure and peripheral tension on the rim. I eliminate entirely wedging devices; all parts of my rim respond to the pressure on lines parallel with the axis and lateral with the wheel body. And the integral parts of the rim contacting with the side of the wheelbody move laterally of the wheel and are secured in a neutral plane to circumferentially form the double-line contact between the rim and wheel.

I believe myself to be the first to have so constructed a wheel body, a demountable rim and a side removable flange, that the rim together with the flange, holding an inflated tire on the channel thereof, is removably secured on the wheel body, without any wedging means, by integral means embodied in the rim, flange and wheel body, thus serving two purposes, one of which secures the tire on the rim; the other, independent of the first, locks the rim on the wheel. And I am the first to have provided (a) a demountable rim having an integral tire-engaging portion and a circumferential smooth surface for contacting with the periphery of the outer bead of a tire, which surface extending to and terminating in a series of spaced radially extending flanges to be mated with (b) an endless side removable flange having a circumferential outer periphery comprising a tire-engaging portion and an inner periphery comprising a rim-side engaging portion radially extending to and terminating in a series of spaced radially extending flanges, and (c) means, independent of the last said means, by which the rim is mated with the flange to carry an inflated tire irrespective of the wheel body. And it is obvious by such construction that, by the combined integral means of the rim, flange and wheel body, the assembled rim with the tire is demountably positioned on the wheel, depending upon the same means which bind the side of the rim with the flange to carry the tire, to be locked together.

It is to be understood that if desired or necessary to have the outer side of the rim radially extended to or formed a circularly integral radial flange, the rim may be constructed with a side integral flange, as particularly shown at the circularly dotted line by the arrow A, and, similarly, the same flange may be formed with the inner periphery of the side removable flange, as particularly shown by the circularly dotted line and arrow B.

To those who are skilled in the art, it will be apparent that by means of the structure herein particularly disclosed, I accomplish the fulfillment of all the objects and requirements herein set forth.

While I have illustrated and described my invention in accordance with the drawings, I desire it to be understood that the details of construction may be materially varied, and that many changes, modifications and substitutions may be made in the demountable rim herein illustrated, provided the means are employed without departing from the spirit and scope of my invention set forth in the claims.

Having thus described my invention, I desire to secure the same by Letters Patent in the following:—

1. An endless cylindrical demountable rim having an inner-side integral circumferential flange and a circumferential smooth surface outwardly extending to and terminating in a series of spaced radially extending flanges, an outer opening and an inner opening in each of said flanges, an endless annular flange having an outer circumferential periphery and an inner circumferential periphery circumferentially extending to and terminating in a series of spaced radially extending flanges, an outer opening and an inner opening in each of said flanges, the said latter flanges with their openings corresponding to and aligning with the former flanges with their openings, the said annular flange being mated with the outer side of the rim to register the series of flanges and openings thereof with the series of flanges and openings of the rim, a series of square-headed bolts each having a blunt portion and passed outwardly through the said outer openings to secure the registered parts together, and a series of nuts each secured to the threaded portion of each of said bolts to lock the registered parts together.

2. A demountable tire-carrying rim provided with an inner-side integral circumferential tire-engaging portion and a circumferential tire-seating surface outwardly extending to and terminating in a series of rolled-over spaced integral radially extending flanges, a suitable outer opening and a suitable inner opening in each of said flanges, an independent endless annular flange provided with an outer circumferential tire-engaging periphery and an inner circumferential rim-engaging periphery circumferentially extending to and terminating in a series of spaced radially extending flanges, a suitable outer opening and a suitable inner opening in each of said flanges, a series of square-headed bolts each having a suitable terminating head portion, an assembled tire-casing mounted circumferentially on said tire-seating surface engaging with the tire-engaging portion thereof, said independent annular flange being mated with the outer side of the rim to be engaged with the outer side of the tire and the flanges with their openings thereof aligned one with the other, said bolts each passing through the outer openings of each of the flanges of the respective rim and flange to secure the registered parts together, and a series of nuts each threadedly secured to each threaded portion of the bolts to draw the aligned parts together and hold the tire in position between the inner-side tire-engaging portion of the rim and outer circumferential periphery of the flange.

PHILIP M. MILLER.